W. CHRISTIE.
TRACTOR.
APPLICATION FILED FEB. 25, 1920.
1,336,133.
Patented Apr. 6, 1920.
6 SHEETS—SHEET 4.
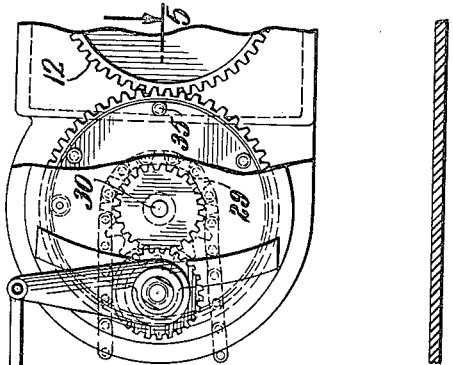
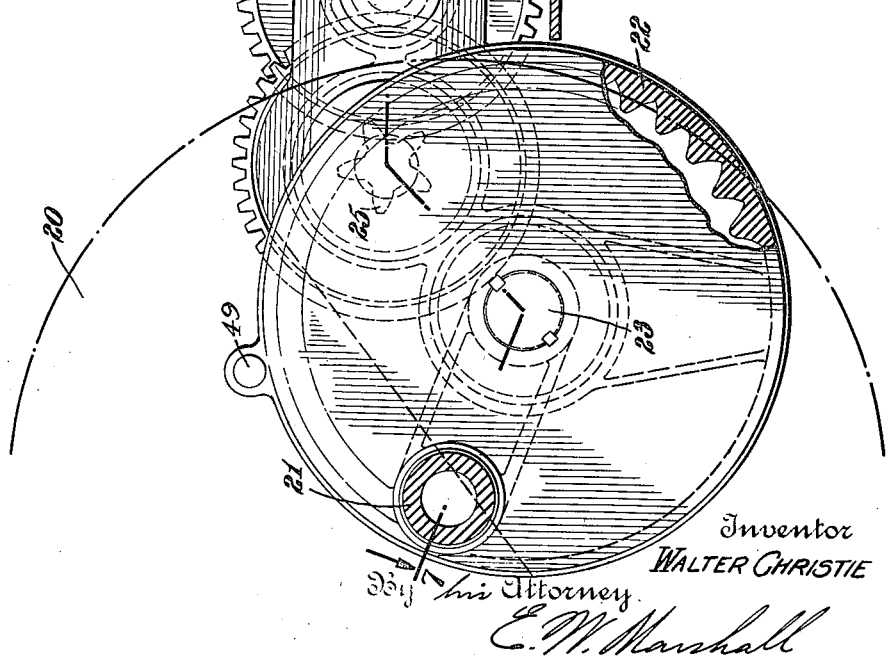
Fig. 4.
Inventor
WALTER CHRISTIE
By his Attorney
E. W. Marshall W. CHRISTIE.
TRACTOR.
APPLICATION FILED FEB. 25, 1920.
1,336,133.
Patented Apr. 6, 1920.
6 SHEETS—SHEET 5.
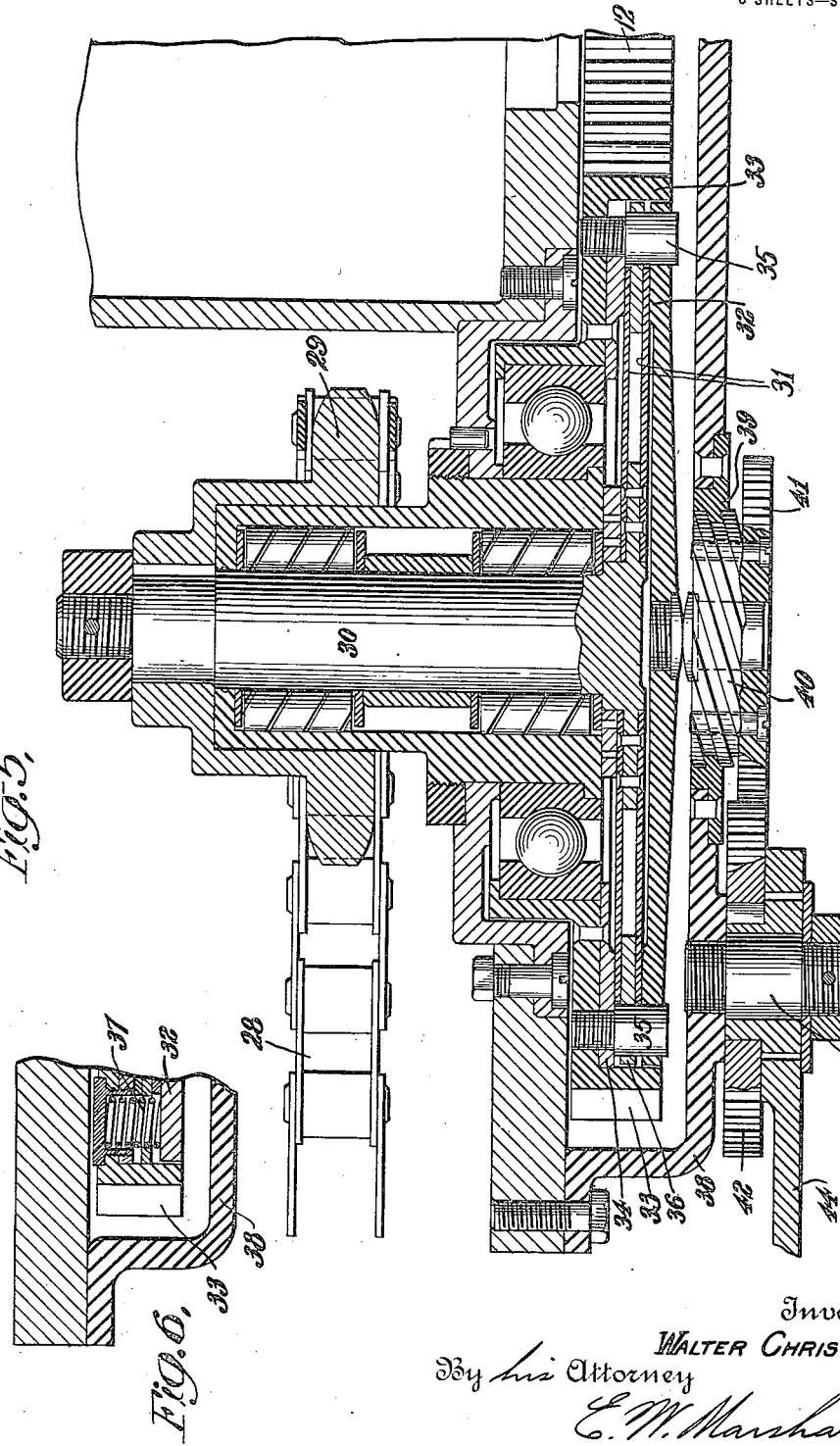
Inventor
WALTER CHRISTIE
By his Attorney
E. W. Marshall

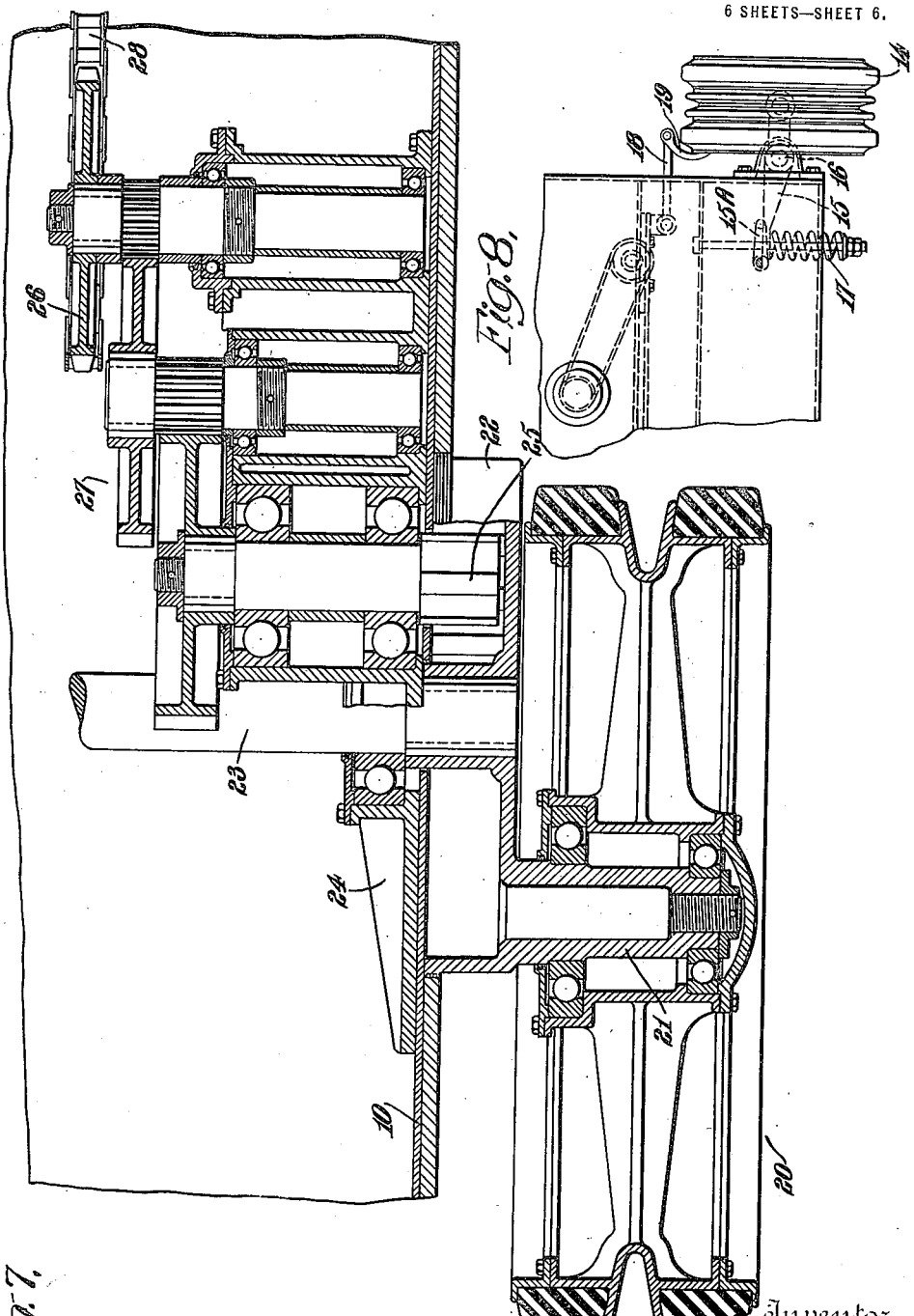

UNITED STATES PATENT OFFICE.

WALTER CHRISTIE, OF WEEHAWKEN, NEW JERSEY.

TRACTOR.

1,336,133. Specification of Letters Patent. Patented Apr. 6, 1920.

Application filed February 25, 1920. Serial No. 361,202.

*To all whom it may concern:*

Be it known that I, WALTER CHRISTIE, a citizen of the United States of America, and a resident of Weehawken, county of Hudson, and State of New Jersey, have invented certain new and useful Improvements in Tractors, of which the following is a specification, reference being had to the accompanying drawings, forming a part thereof.

My invention relates to improvements in tractors, and its object is to provide a motor driven vehicle with end wheels and with intermediate wheels arranged to be depressed to elevate one or the other end of the apparatus. Another object is to provide mechanism by means of which the propelling motor may be used to depress the intermediate wheels. A still further object is to so arrange the wheels that they may either run upon the ground or may have a tractor chain interposed between them and the ground. Another object is to so support the wheels at one end that they may be either locked in alinement with the other wheels in order to guide the chains or may be unlocked and turned about vertical axes to steer the apparatus. A further object is to make the intermediate depressible wheels of larger diameter than the end wheels in order to maintain the wheel guides for the chain at substantially the same distance apart during all positions of the intermediate wheels and also to provide a resilient tension device for each chain.

These and other objects of the invention will appear in the following specification in which I will describe the invention and the novel features of which will be set forth in appended claims.

Referring to the drawings:

Fig. 4 is a side elevation partly in section of the motor driven mechanism for depressing the intermediate wheels.

Fig. 5 is a sectional plan view on an enlarged scale of a part of the mechanism shown in Fig. 4, the section being taken on the line 5—5 of the latter figure. This figure illustrates the clutch device.

Fig. 6 is a detail section of one of the clutch releasing springs.

Fig. 7 is a sectional view taken on the line 7—7 of Fig. 4.

Fig. 8 is a plan view partly in section of the mounting for one of the front wheels.

Like characters of reference designate corresponding parts in all the figures of the drawings.

Figure 1:
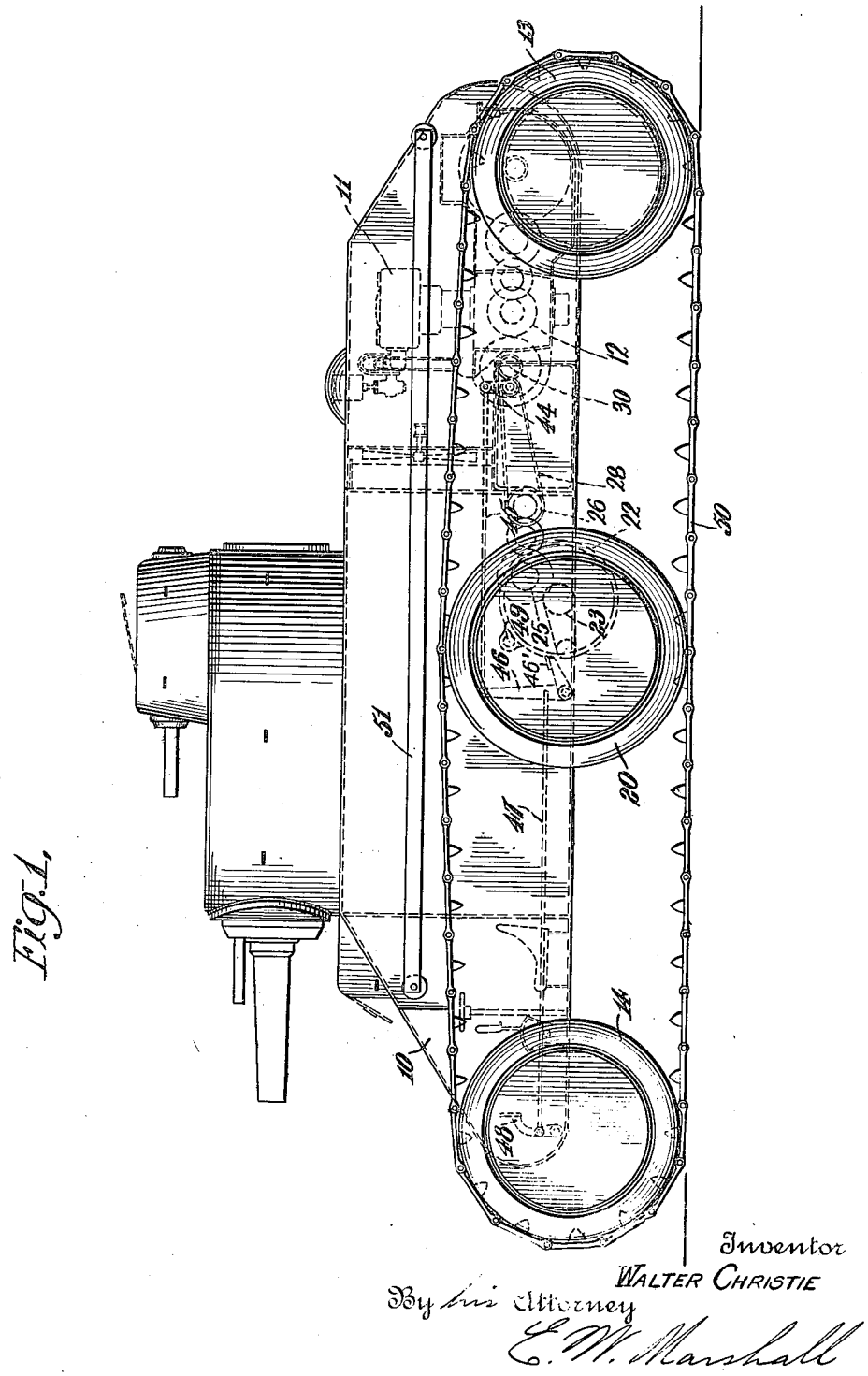
Figure 1 is a side elevation of an apparatus which is made according to and embodies this invention.

10 designates a frame upon which the various parts of the apparatus are mounted. 11 is an engine set transversely on this frame near one of its ends and connected by independent and separately controlled transmission gearing 12 to drive either or both of the rear wheels 13 in either direction.

Near the other end of the frame the front wheels 14 are mounted on vertical pivots near one end of a lever 15 which is pivoted at 16 and aganst the other end of which presses a compression spring 17. The wheel 14 is connected with a transversely movable manually actuated steering rack by a link 18 connected with a bracket 19 projecting from a non-rotatable part of the wheel. The lever 15 may be locked against movement in one direction by means of an arm 15^A which is illustrated, described and claimed in my copending application for patent, Serial No. 315,777, filed August 6, 1919.

Between the wheels 13 and 14 are intermediate wheels 20 each of which is pivoted to a boss 21 projecting eccentrically from a bull-gear 22. This bull-gear is keyed to a transverse shaft 23 mounted in a frame 24 affixed to the vehicle frame 10. This frame 24 also carries a pinion 25 which meshes with the teeth of the bull-gear, a sprocket wheel 26 and intermediate reduction gearing 27. The intermediate wheel 20 on the other side is mounted on a crank keyed to shaft 23 and of the same eccentricity as that of the boss 21.

A sprocket chain 28 connects sprocket wheel 26 with a sprocket wheel 29 keyed to a shaft 30 on the other end of which are affixed the clutch plates 31. A fly wheel 32 which rotates with a gear 33 in mesh with a part of the transmission gearing 12 has a surface which engages with the outer surface of one of these clutch plates.

A pressure plate 34 is affixed to the gear by studs 35 which project through the fly wheel and through an intermediate pressure plate 36. The pressure plate engages with the outer surface of the other clutch plate and the pressure plate 36 with the inner surfaces of both of the clutch plates. Springs 37 shown in Fig. 6 tend to keep these plates apart.

Mounted in the casing 38 of this clutch mechanism is a high pitch nut 39 in which fits a threaded member 40 which when rotated pushes the fly wheel 32 inwardly against springs 37 to cause the plates to engage and cause shaft 30 to rotate with the fly wheel. A gear 41 on member 40 meshes with a gear 42 on a stud 43 and keyed to an arm 44. 45 is a rod connecting arm 44 with a bell crank lever 46 and 47 is another rod connecting the lever 46 with a treadle 48 which the operator may depress to actuate the clutch.

When the clutch is actuated the bull gear 22 will be rotated by the mechanism described to depress wheel 20. This rotation is limited by the engagement of a pin 49 with the short arm of the bell crank lever which releases the clutch.

An arm 60 affixed to shaft 23 is arranged to limit the upward movement of the wheels 20 by contact with an abutment 61 pivoted to the frame at 62. This may be swung out of the way by the operator by means of a lever 63 and a connecting rod 64.

Figure 2:
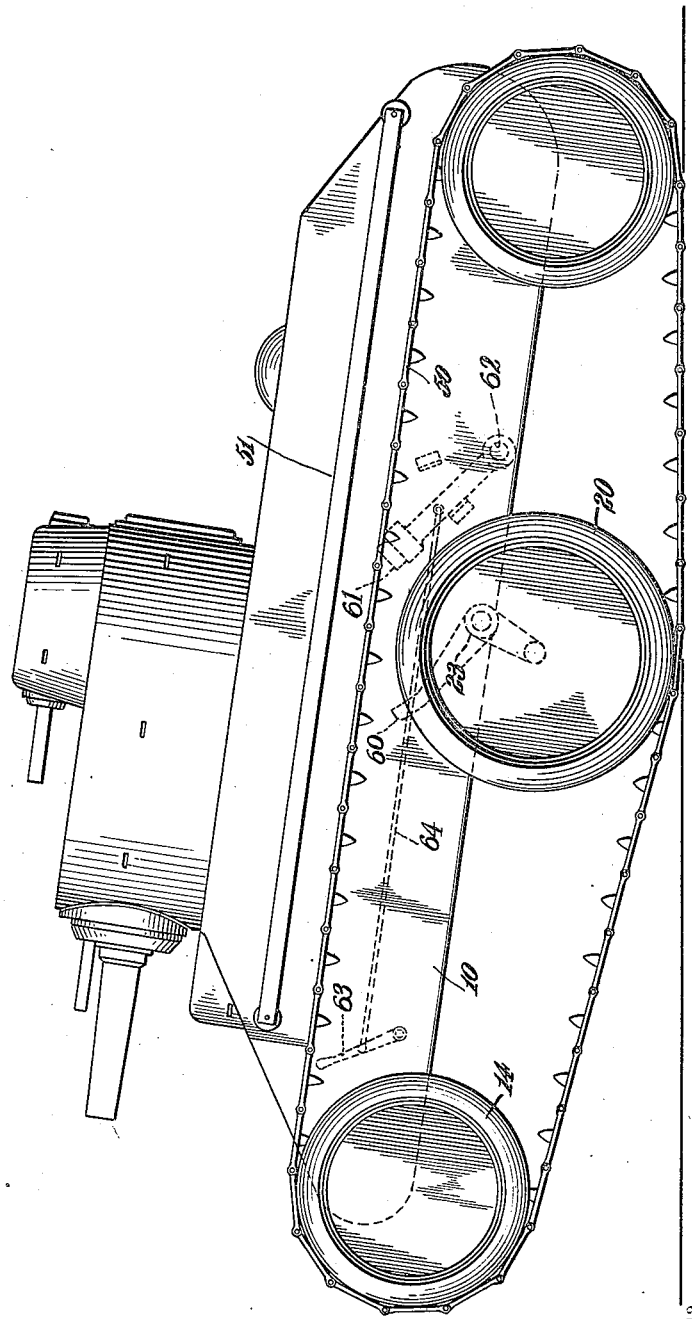
Fig. 2 is a side elevation of the same apparatus with the intermediate wheels depressed and one end of the apparatus raised.
Figure 3:
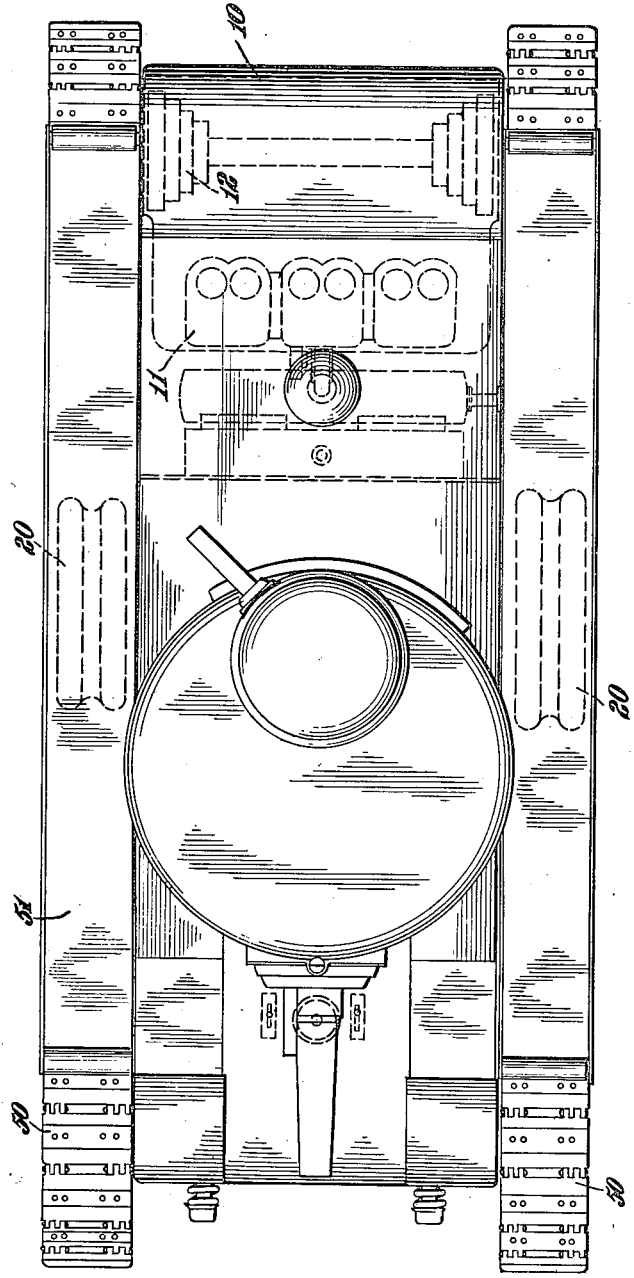
Fig. 3 is a plan view of the structure shown in the preceding figures.

A tractor chain 50 may be placed around the wheels 13, 14 and 20. The wheel 20 is of larger diameter than the others so that when the lower parts of the wheel are on even ground, as shown in Fig. 1, the upper part of the chain will be elevated, and when the wheel 20 is depressed, as shown in Fig. 2, the lower part of the chain will be depressed so that in both positions of the wheel 20 the chain length will be substantially the same. In addition to this means for preventing the chain from becoming loose, the spring 17 which tends to force the front wheel forward, acts as a resilient tension device for the chain.

The wheels 20 are placed near the center of gravity of the apparatus. Thus if the tractor is approaching a bank or elevation of ground, the front wheels 14 will be elevated as shown in Fig. 2. On the other hand, if when the wheels 20 are depressed the apparatus is approaching a depression in the ground. The lowering of the wheels 20 will have the effect of permitting the front end of the tractor to drop, thus in effect, elevating the rear wheels 13 relatively to the wheels 20 and 14.

The wheels 20 may be maintained in their depressed condition by the operator maintaining a pressure upon the treadle 48 which will be opposed by the contact of pin 49 on the bull gear with one arm 46' of the bell crank 46 which is operatively connected by link 47 with foot treadle 48. As soon as he releases pressure from the treadle, the clutch is released and the wheels 20 will return to their normal position.

As in my co-pending applications for patents, Serial Nos. 259,310 and 315,777, filed respectively October 23, 1918 and August 6, 1919, this apparatus is arranged to run on its own wheels. In order to put it in condition for this operation, the tractor chains 50 are removed. Shelf brackets 51 are provided for the purpose of supporting these chains when not in use. When the tractor chains are removed, the levers 15 are locked and the steering gear is unlocked. The apparatus may then be run as a road vehicle at a comparatively high rate of speed. In this case the intermediate wheels 20 will bear lightly on the ground or they may be raised out of contact with the ground or depressed slightly in order to make them bear their proportionate share of the total weight of the apparatus. The latter is desirable when the apparatus is heavy and is crossing bridges.

When the tractor chains are used, the supporting gear is locked and the levers 15 are unlocked. In the well-known manner the wheels 13 are driven from the engine 11 by independently and separately controlled transmission gearing. The apparatus is then steered by driving the wheels 13 at different rates of speed or in opposite directions.

As illustrated in the drawings, this device is arranged as a "tank" with turreted guns supported on its frame. This structure is not described specifically because the apparatus is obviously adapted for other uses than this. In fact the invention upon which this application is based is broader in scope than the particular embodiment thereof which has been shown and described, and I intend no limitations other than those imposed by the appended claims.

What I claim is:

1. A tractor comprising a frame, wheels near the ends thereof, including steering wheels near one end thereof, wheels intermediate said end wheels, tractor chains around the wheels, means for depressing the intermediate wheels to raise an end of the frame, and a motor arranged to propel the tractor and to actuate the wheel depressing means.

2. A tractor comprising a frame, wheels near the ends thereof, wheels of larger diameter intermediate said end wheels, tractor chains around the wheels, and means for depressing the intermediate wheels.

3. A tractor comprising a frame, wheels near the ends thereof, wheels of larger diameter intermediate said end wheels, tractor chains around the wheels, means for depressing the intermediate wheels, and tension devices for the chains.

4. A tractor comprising a frame, wheels near the ends thereof, wheels of larger diameter intermediate said end wheels, tractor chains around the wheels, means for depressing the intermediate wheels, and resilient means arranged to have a tendency to increase the distance between the wheels at opposite ends of the tractor.

5. A tractor comprising a frame, wheels near the ends thereof to carry the weight of the tractor, wheels of larger diameter intermediate said end wheels, and tractor chains removably passing under all of said wheels.

6. A tractor comprising a frame, wheels near the ends thereof to carry the weight of the tractor, wheels of larger diameter between said end wheels, tractor chains removably passing under all of said wheels, and resilient means arranged to have a tendency to increase the distance between the wheels at opposite ends of the tractor.

7. A tractor comprising a frame, a motor, wheels near one end of the frame arranged to be driven by the motor, wheels near the other end of the frame arranged to be oscillated to steer the tractor, wheels intermediate said end wheels, means for depressing the intermediate wheels, and removable tractor chains around the wheels.

8. A tractor comprising a frame, a motor, wheels near one end of the frame arranged to be driven by the motor, wheels near the other end of the frame arranged to be oscillated to steer the tractor, a manual steering gear therefor, means for locking said wheels against oscillation, wheels intermediate said end wheels, means for depressing the intermediate wheels, and removable tractor chains around the wheels.

9. A tractor comprising a frame, wheels near the ends thereof, wheels intermediate said end wheels, tractor chains around the wheels, means for depressing the intermediate wheels to raise an end of the frame, and a removable stop independent of said depressing means for maintaining the intermediate wheels in predetermined relation to the ground.

10. A tractor comprising a frame, wheels near the ends thereof, wheels intermediate said end wheels, means for depressing the intermediate wheels to raise an end of the frame, a motor arranged to propel the tractor and to actuate the wheel depressing means, a stop for limiting the upward movement of said intermediate wheels, and manual means for rendering said stop inoperative.

In witness whereof, I hereunto set my hand this 24 day of February, 1920.

WALTER CHRISTIE.

Witness:
HELEN LINDSAY.